US009512918B2

(12) United States Patent
Rozycki et al.

(10) Patent No.: US 9,512,918 B2
(45) Date of Patent: Dec. 6, 2016

(54) SPEED CONTROL SYSTEM FOR A HYDROSTATIC TRANSMISSION

(71) Applicant: Danfoss Power Solutions Inc., Ames, IA (US)

(72) Inventors: Frank J. Rozycki, Colo, IA (US); Simon L. Nielsen, Ames, IA (US); Gary R. LaFayette, Saint Joseph, MI (US)

(73) Assignee: DANFOSS POWER SOLUTIONS INC., Ames, IA (US)

( * ) Notice: Subject to any disclaimer, the term of this patent is extended or adjusted under 35 U.S.C. 154(b) by 238 days.

(21) Appl. No.: 14/301,758

(22) Filed: Jun. 11, 2014

(65) Prior Publication Data

US 2014/0372000 A1 Dec. 18, 2014

Related U.S. Application Data

(60) Provisional application No. 61/834,920, filed on Jun. 14, 2013.

(51) Int. Cl.
| F16H 61/4017 | (2010.01) |
| F16H 61/48 | (2006.01) |
| F16H 61/4157 | (2010.01) |

(52) U.S. Cl.
CPC .......... *F16H 61/48* (2013.01); *F16H 61/4017* (2013.01); *F16H 61/4157* (2013.01)

(58) Field of Classification Search
None
See application file for complete search history.

(56) References Cited

U.S. PATENT DOCUMENTS

| 5,121,603 A | 6/1992 | Widemann |
| 6,360,537 B1 | 3/2002 | Widemann |
| 7,121,297 B2 | 10/2006 | Thoms |
| 7,201,183 B2 | 4/2007 | Thoms |
| 7,874,153 B2 | 1/2011 | Behm |
| 2011/0308878 A1* | 12/2011 | Shirao .................. B60W 10/06 180/305 |

OTHER PUBLICATIONS

Sauer Danfoss; "Axial Piston Pump 115/130, 147/165, ISL Integrated Speed Limitation, Technical Information;" Jan. 2013; pp. cover page-40; Sauer Danfoss.
Sauer Danfoss; "IBF Integrated Brake Function;" Feb. 2004; pp. 1-2; Sauer Danfoss.

* cited by examiner

*Primary Examiner* — Edwin A Young
(74) *Attorney, Agent, or Firm* — Zarley Law Firm, P.L.C.

(57) ABSTRACT

A speed control system for a hydrostatic transmission includes an engine having a drive shaft connected to a hydraulic pump. At least one hydrostatic motor is connected to the pump in a closed circuit by a flow line. Connected to the motor via a system shaft is a vehicle system. A controller is connected to a plurality of sensors and a high pressure relief valve that is connected to the flow line between the pump and the motor. Based on information received from the sensors, the controller sets the pump and motor displacements to limit the pressure to a value that will not overspeed the engine and allow the system to automatically provide braking beyond the engine's capability. This may be accomplished through the use of various algorithms.

18 Claims, 2 Drawing Sheets

SPEED CONTROL SYSTEM FOR A HYDROSTATIC TRANSMISSION

CROSS REFERENCE TO RELATED APPLICATION

This application claims the benefit of U.S. Provisional Application No. 61/834,920 filed Jun. 14, 2013.

BACKGROUND OF THE INVENTION

This invention is directed to a speed control system for hydrostatic drives and particularly to speed control systems that have insufficient engine braking power to provide braking to the system or limit the amount of engine overspeed.

Systems for controlling speed and in hydrostatic drives with insufficient braking power are known in the art. As an example, an integrated speed limiter (ISL) consists of a pilot pressure setting and bypass orifice acting with a pressure reducing valve to automatically limit the pump torque input to the engine. Excess hydrostatic power is converted to heat. In these systems, the pressure reduction of oil occurs inline between the pump and motor rotating kits. Oil passes through the pressure reducing valve and into the pump rotating kit. Examples include U.S. Pat. Nos. 7,201,183; 7,121,297; 6,360,537; and 5,121,603.

Similarly, systems which function based on an operator brake input device with microcontroller for systems with insufficient engine braking power are known in the art. For example, U.S. Pat. No. 7,874,153 teaches a system where motors swivel out proportionally to brake pedal travel and braking takes place by means of diesel engine drag torque with secondary force applied via pressure relief valves. In this system, the flow path of the pressure reduction is different than the previous example (i.e., ISL). The pressure relief consumes a portion of the flow being transmitted from the motor. This flow bypasses the pump rotating kit to the low pressure side of the circuit.

While helpful, these systems do not address the need for a system which functions automatically (with or without operator input) and is controlled and configured by a microcontroller. Needed is a system with maximum and immediate utilization of available drag torque possible when demanded, with or without operator input from a control lever, brake input device, or some other physical device. Also needed is a system which automatically transitions to a condition where vehicle braking can exceed the engine's capability.

An objective of the present invention is to provide a speed control system for a hydrostatic transmission that automatically adjusts speed through use of a microcontroller.

Another objective of the present invention is to provide a speed control system for a hydrostatic transmission that immediately maximizes the use of available drag torque when demanded.

Another objective of the present invention is to provide a speed control system for a hydrostatic transmission that automatically transitions to a condition where vehicle braking can exceed the engine's capability.

These and other objectives will be apparent to one of ordinary skill in the art based upon the following written description, drawings and claims.

SUMMARY OF THE INVENTION

A speed control system for a hydrostatic transmission includes an engine having a drive shaft connected to at least one hydraulic pump. At least one hydrostatic motor is connected to the pump in a closed circuit by a flow line. Connected to the motor via a system shaft is a vehicle system.

A controller is connected to a plurality of sensors and a high pressure relief valve that is connected to the flow line between the pump and the motor. Based on information received from the sensors, the controller sets the pump displacement while increasing and decreasing motor displacement to provide braking for the vehicle while not overspeeding the engine. This may be accomplished through the use of two distinct embodiments.

DETAILED DESCRIPTION OF THE PREFERRED EMBODIMENTS

Figure 1:
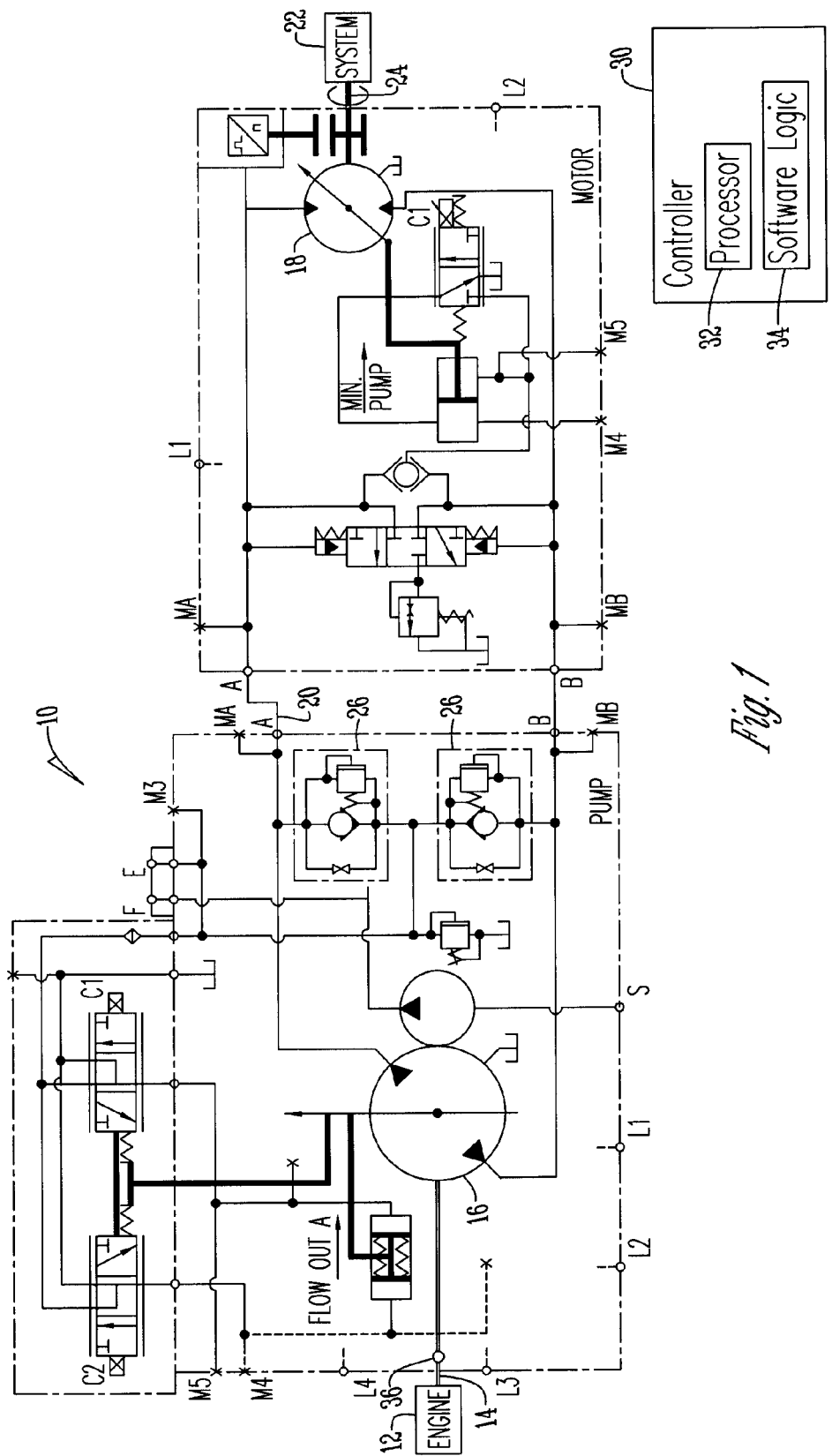
FIG. 1 is a schematic view of a speed control system.
Figure 2:
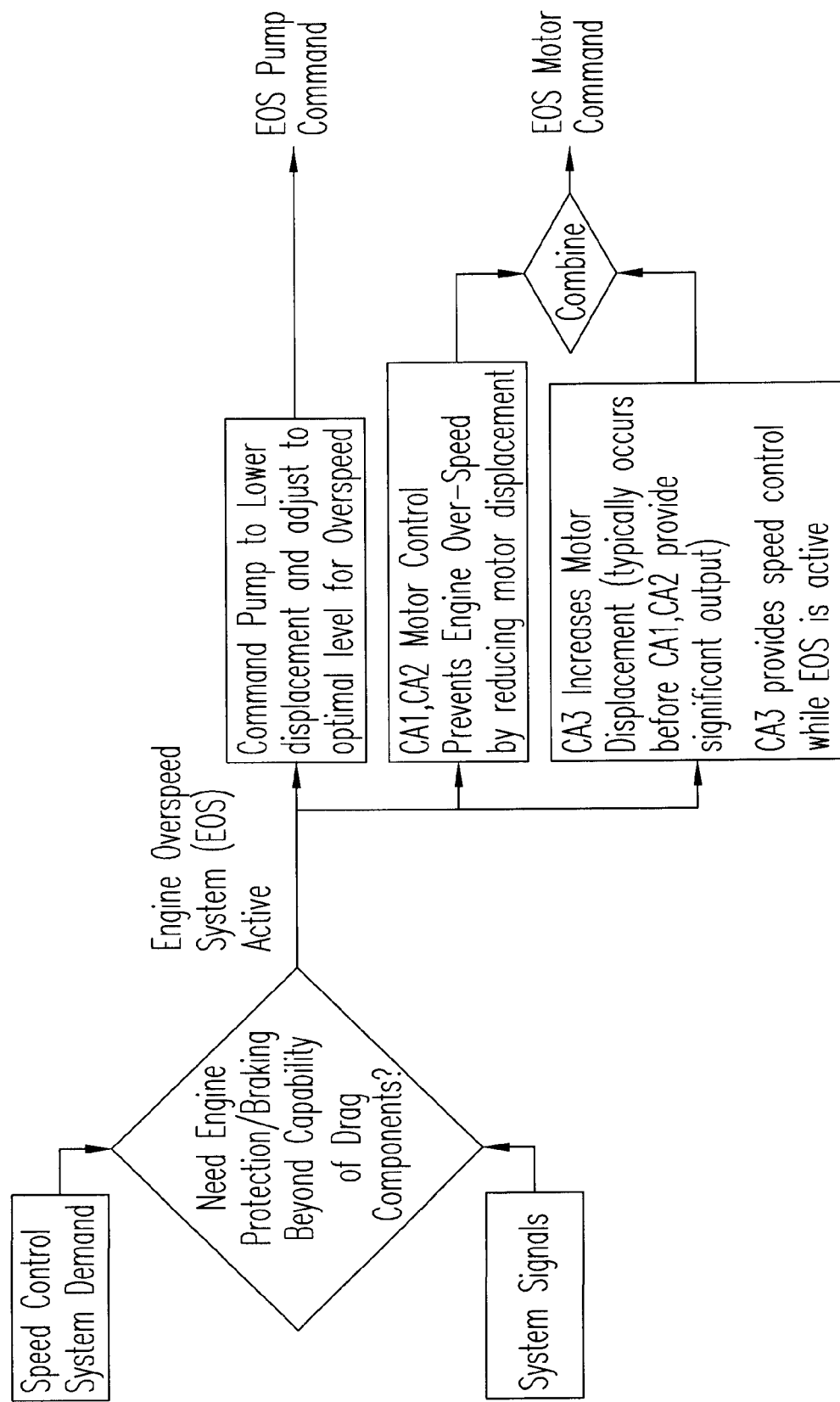
FIG. 2 is a flow diagram of a method of controlling speed.

Referring to the Figures, the speed control system 10 is set forth in the schematic diagrams of FIG. 1. Generally, the system 10 includes an engine 12 having a drive shaft 14 connected to a hydraulic pump 16. The hydraulic pump 16 is a variable displacement pump. The hydraulic pump 16 is connected to one or more hydraulic motors 18 in a closed circuit by a flow line 20. The hydraulic motors 18 may be fixed or variable displacement motors. The hydraulic motor (s) 18 are connected to a system 22, such as a vehicle system 22, by a system shaft 24.

Connected to the flow line 20, between the hydraulic pump 16 and the hydraulic motor 18, is one or more high pressure relief valves 26. The high pressure relief valves 26 may or may not be direct acting and may or may not have an electronically or hydraulically adjustable/toggleable setting. Further, the high pressure relief valves 26 are positioned within the circuit such that the flow path of fluid energy conversion passes over the relief valve 26 and bypasses the rotating kit, flowing to the low pressure side of the circuit.

Connected to the circuit is a controller 30 having a processor 32 that operates software logic 34. The controller 30 is also connected to a plurality of sensors 36. The sensors are positioned to detect engine load, system speed, differential pressure across the pump and the like. Other signals might be engine percent load at speed, the engine percent load, the engine speed error which is a set point minus actual, the system speed command, the process requirements such as a process speed control, differential pressure across the pump, or a software error.

In a first embodiment, a speed control event starts as the controller 30 detects when the braking demands of the speed control system 10 are unable to be met by the engine moment at an existing pump displacement. The controller 30 detects this event using engine speed and one or more of the engine percent load at speed, the engine percent load, the engine speed error which is a set point minus actual, the system speed error which is a set point minus actual, the system speed command, the process requirements such as a process speed control, Delta pressure across the pump, or a software error.

Once detected, the controller 30 commands the pump 16 to a reduced displacement that will cause a slightly unacceptable engine overspeed at the maximum pressure governed by the relief valve. Simultaneously, hydraulic motors 18 receiving the pump flow are onstroked and destroked at a rate resulting in a non-constant transmission ratio from the initiation of the controller's 30 detection. Typically, the initial change in motor displacement will be in the direction of increased displacement. The objective is to protect the engine 12 while achieving the desired responsiveness (up to as much braking as possible) based on the command from the speed control system. This can be accomplished with control algorithms 1 and 2.

Once the pump 16 is at a lower displacement that would cause a slightly unacceptable amount of engine overspeed, the pump displacement is fine-tuned with actual engine speed feedback. The motor 18 can now modulate fully to respond to the speed control system 10 without regard to protecting the engine 12. Because the maximum pressure of the system is limited by the relief valve 26, the fine-tuned pump displacement value will never be zero displacement. The motor is governed by control algorithm 3 to provide the braking demanded by the speed control system. Any excess flow from the motors is relieved over the high pressure relief valve 26, allowing for energy to be converted to heat. The total braking power available to the transmission consists of brake power consumed by the engine and total leakage across the loop, along with other inefficiencies that typically occur. The flow across the high pressure relief valve 26 is a significant flow across the loop and provides a significant source of power conversion to heat.

The speed control event ends when the controller 30, based upon the variables above, detects that braking demands of the speed control system 10 are able to be met by the engine moment without flow over the high pressure relief valve 26. Thus, pump and motors stroke in increasing and decreasing displacement volumes with motor algorithms active to achieve the demands of the speed control system 10 as effectively as possible while protecting the engine 12. Control algorithms 1 and 2 achieve the goal of protecting the engine from overspeed during this step. Also, varying pump displacement may be utilized to provide a proportional amount of engine speed to system braking effort or best prepare the transmission for the end of a braking event.

In a second embodiment, the sensor information including engine speed determines a pump maximum operating point. As the indicated amount of braking demanded by the speed control system increases, the pump tends toward a lower displacement.

Simultaneously, hydraulic motors 18 receiving the pump flow are onstroked and destroked at a rate resulting in a non-constant transmission ratio from the initiation of the controller's 30 detection. Typically, the initial change in motor displacement will be in the direction of increased displacement. The objective is to protect the engine 12 while achieving the desired responsiveness (up to as much braking as possible) based on the command from the speed control system. This can be accomplished with control algorithms 1 and 2, which monitor the system at all times.

Once the pump 16 is at a low enough displacement, the relief valve governed pressured and displacement level begins to protect the engine from excessive overspeed. The pump displacement continues to be adjusted with actual engine speed feedback.

The motor 18 can now modulate fully to respond to the speed control system 10 without regard to protecting the engine 12. Because the maximum pressure of the system is limited by the relief valve 26, the pump displacement value will never be 0 displacement. The motor is governed by control algorithm 3 to provide the braking demanded by the speed control system.

Any excess flow from the motors is relieved over the high pressure relief valve 26, allowing for energy to be converted to heat. The total braking power available to the transmission consists of brake power consumed by the engine and total leakage cross the loop, along with other inefficiencies that typically occur. The flow across the high pressure relief valve 26 is a significant flow across the loop and provides a significant source of power conversion to heat.

Using a first algorithm (control algorithm 1), the motors modulate displacement to limit the pressure to the pump 16 to a value that is slightly higher than an acceptable value for engine over-speed. The amount of over-speed of the engine is related to the torque input to the engine 12 from the pump 16. The torque input from the pump 16 is defined by the pressure multiplied by the displacement of the pump 16. So, for a given pump displacement, the motors 18 will attempt to limit the pressure to a value that is slightly higher than acceptable. In one embodiment the pressure value would be 20% greater than the acceptable value. When the pump 16 is at lower displacements, a higher pressure set-point will occur. When the pump 16 is at higher displacements, a lower set-point will occur. Limiting or reducing motor displacement limits the pressure, while increasing motor displacement increases the pressure. The first algorithm limits pressure by the motors 18 by targeting a difference in flow between the pump 16 and the motor 18. This difference in flow correlates to the pressure that will result with limited accuracy depending upon whether pressure signals are used to fine-tune the motor output to obtain desired pressure.

Using a second control algorithm, the motor displacement modulates in response to an actual engine speed signal to change the pressure from a value slightly higher than acceptable to the exact required value. Of course, the maximum pressure in the system is limited by a high pressure relief valve. Therefore, below some level of pump displacement, the first and second algorithm's motor controls will no longer need to reduce the motor's maximum permissible displacement, because the relief valve 26 limits the maximum pressure.

Using a third algorithm, the motor displacement is increased to provide increased braking as demanded by the speed control system 10. The third algorithm cannot override the first and second algorithms, so the engine is always protected from overdrive. Once the high pressure relief valve 26 has limited the maximum pressure, the third algorithm will not be limited and the motor displacement setpoint will increase and flow will move through the high pressure relief valve 26. The amount of motor displacement increase, and consequently high pressure relief valve flow, is determined by the demand of the speed control system 10.

Based upon the disclosure of these embodiments, the pump 16 and motor 18 actuate at non-constant transmission ratios to provide optimal braking responsiveness for the speed control system 10. The motor is may either increase displacement volume, decrease, or do both when braking is demanded beyond the engine's capability. The intensity of the braking is controlled through the speed control system 10 by the actuation of a hydraulic motor 16, initially without and subsequently with the flow over the high pressure relief valve 26 depending upon the state of the event or pump displacement. The displacement of the pump 16 is actively reduced to govern an acceptable level of engine overspeed. The brake intensity to the system 10 is not directly or not at all defined by the operator's command from a control lever of brake input device. The transition to and from a transmission state in which there is fluid flow through the high pressure relief valve occurs automatically according to the control algorithms.

What is claimed:

1. A speed control system, comprising:
   an engine having a drive shaft connected to a hydraulic pump;
   at least one hydraulic motor connected to the hydraulic pump in a closed circuit by a flow line;
   a vehicle system connected to the at least one hydraulic by a system shaft;
   at least one high pressure relief valve connected to the flow line between the hydraulic pump and the hydraulic motor;
   a controller having a processor to operate software logic connected to the closed circuit and a plurality of sensors;
   wherein the controller detects a braking demand beyond the engine's capability and commands the pump to a displacement at which engine overspeed will occur.

2. The system of claim 1 wherein the at least one high pressure relief valve is positioned within the closed circuit such that a flow path of a fluid energy conversion passes over the at least one high pressure relief valve to a low pressure side of the closed circuit.

3. The system of claim 1 wherein the pump displacement is further set based upon actual engine speed.

4. The system of claim 1 Wherein the pump displacement is continuously commanded from a normal operating displacement to a lowered displacement based upon a continuous signal that includes at least engine speed.

5. The system of claim 1 wherein displacement of the motor is increased by the controller to meet demands of the speed control system.

6. The system of claim 1 wherein the controller modulates displacement of the motor to limit pressure to the pump to a value higher than a value for engine over speed.

7. The system of claim 6 wherein the controller modulates displacement of the motor in response to an actual engine speed signal to change pressure from the higher value to an exact required value.

8. The system of claim 1 wherein the controller utilizes a first, a second, and a third algorithm.

9. The system of claim 8 wherein the first algorithm modulates motor displacement to limit pressure to the pump to a value higher than engine overspeed based upon torque input to the engine from the pump.

10. The system of claim 8 wherein the first algorithm limits pressure from the at least one hydraulic motor based on a difference in flow between the pump and the at least one hydraulic motor.

11. The system of claim 8 wherein the second algorithm modulates motor displacement in response to an actual engine speed signal to change a pressure value from a value causing engine over speed to an exact required value.

12. The system of claim 8 wherein the third algorithm, without overriding the first and the second algorithm, increases motor displacement to provide increased braking as demanded by the system.

13. A speed control system, comprising:
   an engine having a drive shaft connected to a hydraulic pump;
   at least one hydraulic motor connected to the hydraulic pump in a closed circuit by a flow line;
   a vehicle system connected to the at least one hydraulic by a system shaft;
   at least one high pressure relief valve connected to the flow line between the hydraulic pump and the hydraulic motor;
   a controller having a processor to operate software logic connected to the closed circuit and a plurality of sensors;
   wherein the controller, based on a detected braking demand, sets pump and motor displacements to limit pressure to a value that will not overspeed the engine and allow the system to automatically provide braking beyond the engine's capability.

14. The system of claim 13 wherein the controller commands the pump to reduce displacement that will cause engine overspeed at a maximum pressure governed by the relief valve.

15. The system of claim 14 wherein the pump displacement is adjusted based upon actual engine feedback once the pump is at the lower displacement that will cause engine overspeed.

16. The system of claim 13 wherein the at least one hydraulic motor is onstroked and destroked at a rate resulting in a non-constant transmission ratio.

17. The system of claim 13 wherein excess flow from the at least one hydraulic motor is relieved over the high pressure relief valve allowing energy to be converted to heat.

18. The system of claim 13 wherein the pumps maximum operating point is determined based upon sensor information including engine speed.

* * * * *